United States Patent
Feldman et al.

(10) Patent No.: US 11,853,941 B2
(45) Date of Patent: Dec. 26, 2023

(54) SYSTEMS AND METHODS FOR IDENTIFYING AVAILABLE SERVICES AT A PHYSICAL ADDRESS

(71) Applicant: Verizon Patent and Licensing Inc., Arlington, VA (US)

(72) Inventors: David H. Feldman, Bedminster, NJ (US); Sandeep Juneja, Tampa, FL (US); Randolph Torres, Clermont, FL (US); Allyson M. Norfleet, Summit, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 181 days.

(21) Appl. No.: 16/692,961

(22) Filed: Nov. 22, 2019

(65) Prior Publication Data

US 2021/0158254 A1 May 27, 2021

(51) Int. Cl.
*G06Q 10/0631* (2023.01)
*G06N 20/00* (2019.01)
*G06N 7/02* (2006.01)
*G06Q 10/0637* (2023.01)

(52) U.S. Cl.
CPC ......... *G06Q 10/06315* (2013.01); *G06N 7/02* (2013.01); *G06N 20/00* (2019.01); *G06Q 10/0637* (2013.01)

(58) Field of Classification Search
CPC .................................................... H04W 4/021
See application file for complete search history.

(56) References Cited

U.S. PATENT DOCUMENTS

| | | | |
|---|---|---|---|
| 10,430,478 B1* | 10/2019 | Blalock | G06F 16/9566 |
| 11,055,727 B1* | 7/2021 | Kumar | H04L 63/1408 |
| 2002/0198760 A1* | 12/2002 | Carpenter | G06Q 30/02 |
| | | | 705/7.34 |
| 2012/0059853 A1* | 3/2012 | Jagota | G06F 16/29 |
| | | | 707/E17.014 |

(Continued)

OTHER PUBLICATIONS

Zhao, Chen, and Yeye He. "Auto-em: End-to-end fuzzy entity-matching using pre-trained deep models and transfer learning." May 2019. The World Wide Web Conference. (Year: 2019).*

(Continued)

*Primary Examiner* — Sara Grace Brown

(57) ABSTRACT

A platform may receive a first set of address-occupant pairs from a plurality of source devices, wherein the first set of address-occupant pairs comprises identifications of physical addresses and identifications of occupants. The platform may detect an identification of a physical address that is associated with identifications of a plurality of the occupants. The platform may select, for the physical address, one of the identifications of the plurality of occupants to maintain association with the identification of the physical address. The platform may aggregate infrastructure information with the second set of address-occupant pairs, wherein the infrastructure information indicates one or more services available to be provided at one or more of the physical addresses. The platform may perform one or more actions based on identifying the one or more services available to be provided at one or more of the physical addresses.

20 Claims, 7 Drawing Sheets

(56) References Cited

U.S. PATENT DOCUMENTS

| | | | |
|---|---|---|---|
| 2012/0203726 A1* | 8/2012 | Klabjan | B60L 53/65 706/46 |
| 2015/0081324 A1* | 3/2015 | Adjaoute | G06Q 40/08 705/2 |
| 2016/0019297 A1* | 1/2016 | Mack | G06Q 30/02 707/723 |
| 2016/0092959 A1* | 3/2016 | Gross | G06Q 30/0276 705/26.62 |
| 2017/0091310 A1* | 3/2017 | Mohanlal | G06F 16/215 |
| 2018/0089588 A1* | 3/2018 | Ravi | G06N 20/00 |
| 2018/0332582 A1* | 11/2018 | Bashir | H04W 16/14 |
| 2019/0053013 A1 | 2/2019 | Markhovsky et al. | |
| 2019/0279254 A1* | 9/2019 | Wai | G06Q 30/0207 |
| 2019/0303371 A1* | 10/2019 | Rowe | G06F 16/24564 |
| 2019/0311299 A1* | 10/2019 | Lindner | G06F 21/6209 |
| 2020/0160190 A1* | 5/2020 | Swamy | G06N 20/00 |
| 2020/0258174 A1* | 8/2020 | Rodriguez | G06Q 50/165 |
| 2020/0320548 A1* | 10/2020 | Fusillo | G06F 18/24137 |
| 2020/0336923 A1* | 10/2020 | Li | H04W 24/02 |
| 2021/0004422 A1* | 1/2021 | Sun | G06N 20/00 |
| 2021/0065203 A1* | 3/2021 | Billigmeier | G06N 20/00 |
| 2022/0358607 A1* | 11/2022 | Guo | G06F 16/248 |

OTHER PUBLICATIONS

Croft, David. "Semi-automated co-reference identification in digital humanities collections." (2014). (Year: 2014).*

"Addresses for Everyone", 1 Plus Codes, (available at https://plus.codes, visited Aug. 17, 2020).

"Benefits", Plus Codes, "Benefits" (available at https://plus.codes/benefits, visited Aug. 17, 2020).

"For Businesses", Plus Codes, "For Businesses" (available at https://plus.codes/businesses, visited Aug. 17, 2020).

"Frequently Asked Questions", Plus Codes, "Frequently Asked Questions" (available at https://plus.codes/faq, visited Aug. 17, 2020).

"How it Works", Plus Codes, "How it Works" (available at https://plus.codes/howitworks, visited Aug. 17, 2020).

* cited by examiner

SYSTEMS AND METHODS FOR IDENTIFYING AVAILABLE SERVICES AT A PHYSICAL ADDRESS

BACKGROUND

Many service providers regularly need to provide notifications to their service users (for example, for service status information) and prospective service users (for example, to attract new users, increase usage by existing users, and/or the like). Some services require infrastructure for the service provider to provide the services to a user (e.g., using equipment, systems, cabling, and the like), at a physical address. General notification strategies for a service provider may include delivery of notification material to the general public or to certain segments of the general public.

DETAILED DESCRIPTION OF PREFERRED EMBODIMENTS

Figure 1A:
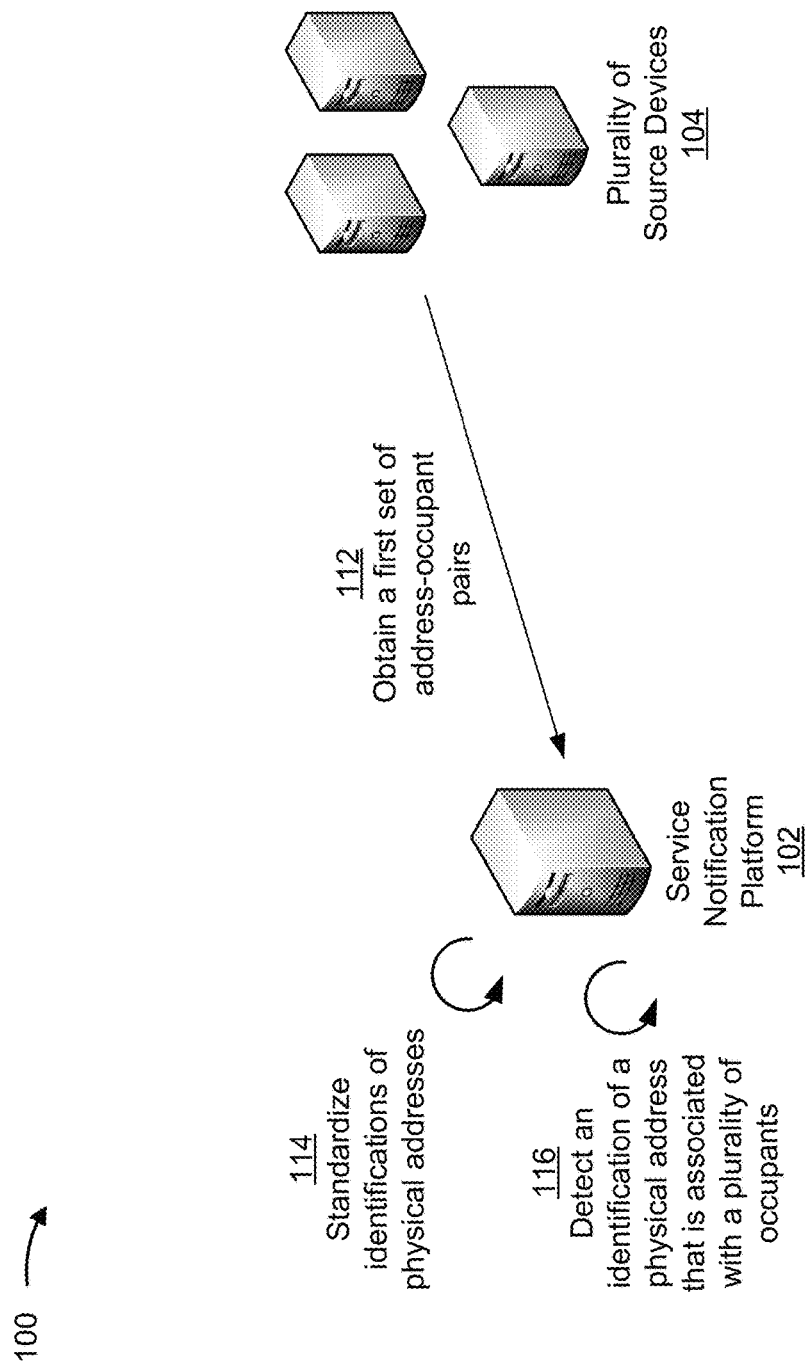
FIGS. 1A-1D are diagrams of one or more example implementations described herein.

The following detailed description of example implementations refers to the accompanying drawings. The same reference numbers in different drawings may identify the same or similar elements.

A service provider may have access to public address information via multiple source devices, multiple user data structures for multiple types of users, multiple notification data structures for multiple types of services, and/or the like, some of which may conflict in identifying physical addresses and associated occupants. With this conflicting information regarding occupants of physical addresses, notifying occupants of a service that is associated with infrastructure (e.g., one or more devices, media, and/or the like through which the service may be provided) is problematic. For example, accurate identification of prospective users that have access to the infrastructure is difficult.

If a service provider relies on physical systems to provide the service (e.g., fiberoptic cables, metal-based cables, plumbing pipes, electrical lines, on-premises or near-premises equipment, and/or the like), the service provider wastes network and/or communication resources (e.g., processor resources, memory resources, communication resources, and/or the like) by providing notification materials to entities that do not have access to the infrastructure. For example, if a provider of a wireless data service that is associated with physical systems serving certain address ranges (e.g., a 5G fixed wireless data service) is making the wireless data service available, it is more efficient to notify only those occupants that may access the wireless data service based on their address being within the address range serviced by the infrastructure systems associated with the wireless data service. Likewise, if a provider of a fiber optic data service that is associated with physical systems serving certain address ranges is making the fiber optic data service available, it is more efficient to notify only those occupants that may access the fiber optic data service based on their address being within the address range serviced by the infrastructure systems associated with the fiber optic data service.

According to some implementations described herein, a service notification platform may aggregate infrastructure information with a relatively accurate set of address-occupant pairs to improve efficiency in notification. The service notification platform may receive a first set of address-occupant pairs from a plurality of source devices. The address-occupant pairs may include identifications of physical addresses and identifications of occupants as identified by the plurality of source devices. Because the data may be old, and because the service notification platform receives address-occupant pairs from multiple sources, the first set of address-occupant pairs may have errors and/or duplicates.

To identify duplicates, the service notification platform may standardize the identifications of addresses (e.g., convert each of 123 N Front St., 123 n Front Street, and 123 North Front St. to 123 North Front Street). In this way, the service notification platform may determine whether different source devices agree on an occupant of a physical address.

The service notification platform may identify an identification of a physical address that is associated with identifications of a plurality of the occupants. For example, the physical address may be associated with an identification of a first occupant and an identification of a second occupant. The service notification platform may select the first occupant to maintain association with the identification of the physical address. In some implementations, the service notification platform may select the first occupant based on a quantity of address-occupant pairs that identify the first occupant as being associated with the physical address. In some implementations, when the service notification platform selects an identification of an occupant to maintain association with an identification of an address, address-occupant pairs including the identification of the address may be given weights based on the source devices from which the address-occupant pairs were received. The service notification platform may discard address-occupant pairs that associate the identification of the address with an occupant that is different from the occupant identified in the selected identification. Duplicate address-occupant pairs may also be discarded.

As a result of discarding some of the address-occupant pairs, the service notification platform may create a second set of address-occupant pairs that is a refined set of address-occupant pairs, which may have improved accuracy when compared to the first set of address-occupant pairs.

The service notification platform may aggregate the second set of address-occupant pairs with infrastructure information that indicates one or more services that are provided, or available to be provided, at one or more of the physical addresses identified in the second set of address-occupant pairs. Based on the aggregate data, the service notification platform may perform actions related to notification of the one or more services to occupants that have access to the one or more services via the infrastructure. In some implementations, the service notification platform may recommend deployment of additional infrastructure based on the second set of address-occupant pairs.

By aggregating a relatively accurate set of address-occupant pairs and infrastructure information, the service notification platform may provide recommendations for efficient notifications related to services associated with the infrastructure. This may conserve networking and computing resources that might otherwise be used to generate and provide notification materials to entities that do not have access to the infrastructure. Additionally, by identifying the occupants to which the services are provided or available to be provided, the platform may provide information relating to selecting a service, of the available services, to identify in the notification material, to identify in user service interfaces, such as support portals, interactive voice response (IVR) prompts, communications with service support personnel (e.g., a sales person), and/or the like. This may conserve network and/or computing resources that might otherwise be used to provide notification materials, determining the correct service within a user interface, and or the like without a specific location and/or service identification.

FIGS. 1A-1D are diagrams of one or more example implementations 100 described herein. As shown in FIGS. 1A-1D, the example implementation(s) 100 may include a notification platform 102, a plurality of source devices 104, a search engine device 106, a service provider device 108, a user management device 110, and/or the like.

As shown in FIG. 1A, and by reference number 112, the service notification platform 102 may obtain a first set of address-occupant pairs from the plurality of source devices 104. The plurality of source devices 104 may push address-occupant pairs (e.g., based on an update, expiration of a time period, and/or the like) or the service notification platform 102 may pull the first set of address-occupant pairs (e.g., via a request). The first set of address-occupant pairs include identifications of physical addresses and identifications of occupants. The plurality of source devices 104 may store, or have access to, information that associates individuals, businesses, and/or other entities that are considered occupants of spaces associated with physical addresses. For example, one or more of the plurality of source devices 104 may include a device associated with a government registry of businesses and associated addresses (e.g., a national or local business registry, a trademark registry, and/or the like), a device associated with a credit record entity (e.g., a credit bureau), a device associated with a private registry of businesses and associated addresses, and/or the like.

The plurality of sources devices 104 may provide the first set of address-occupant pairs in various formats. As received in the various formats, the first set of address-occupant pairs may be stored (e.g., in a data lake) to permit the first set of address-occupant pairs to be received and stored in their natural and/or raw format. The service notification platform 102 may use one or more connectors to filter and/or transform the first set of address-occupant pairs from their natural and/or raw format into a standard format and/or structure. Once the first set of address-occupant pairs have been transformed into a standard format and/or structure, the service notification platform 102 may import the first set of address-occupant pairs into a local, or accessible, data structure for further analysis.

The data structure may include a relational database management system, data analysis libraries, the one or more connectors, a distributed file system designed to run on commodity hardware, an internal search engine for finding data (e.g., particular address-occupant pairs and/or associated information) within the data structure, a user interface (e.g., for accessing data, modifying data, viewing data, and/or the like) within the data structure, an application programming interface for interfacing with other applications (e.g., a search engine, a map and/or direction service application, a notification delivery application, a telephone management application, an interactive sales application, an interactive website, and/or the like), and/or the like.

In some implementations, the identifications of physical addresses may include variations, such as different formats, styles, abbreviations, and/or the like. For example, a first source device may identify a physical address as "123 N Franklin St STE 200," a second source device may identify the same physical address as "123 North Franklin Street, Suite 200," a third source device may identify the same physical address as "123 N Franklin St., #200," and/or the like.

In some implementations, the identifications of occupants may include variations of the same occupant or a different occupant. For example, the first source device may identify an occupant as "Best Toy Company," the second source device may identify the occupant as "The Best Toy Company, Inc.," the third source device may identify the occupant as "The Tire Store," and/or the like. In some implementations, a source device may identify the occupant as a different occupant based on new or old information, relative to other source devices, or based on errors within data accessed by the source device.

As shown by reference number 114, the service notification platform 102 may standardize identifications of physical addresses. For example, the service notification platform 102 may translate identifications of the physical addresses into standardized identifications of the physical addresses. In some implementations, the service notification platform 102 may translate the identifications of the physical addresses using pairings of variations of an address element (e.g., "N," "North," "No.,") with a standard address element ("N"). For example, the service notification platform may include an address matching component that is configured to match raw identifications of the physical addresses to standardized identifications of the physical addresses using a library and/or a list of raw identifications of physical addresses and associated standardized identifications of physical addresses. In some implementations, the service notification platform 102 may translate the identifications of the physical addresses by sending the identifications of the physical addresses to an address translation provider (e.g., a mapping device, a directions generation device, and/or the like).

In some implementations, the service notification platform 102 may separate each of the identifications of the physical addresses into an address and a sub-address. In this way, multiple occupants of a building may be associated with the same identification of a physical address associated with the building, while also being associated with different identifications of sub-addresses that indicate a unit within the building. This may be helpful for determining that multiple occupants are present within the building associated with the physical address, while also supporting removal of one or more conflicting identifications of occupants at the same sub-address.

The service notification platform 102 may assign one or more keys to an identification of a physical address. In some implementations, the service notification platform 102 may assign an address key that is associated with a building address and a sub-address key that is associated with a unit within the building address. The address key and/or the sub-address key may be assigned based on standardized identifications.

As shown by reference number 116, the service notification platform 102 may detect an identification of a physical address that is associated with identifications of a plurality of occupants. For example, the identification of the physical address may be part of a first address-occupant pair with a first occupant (e.g., as received from a first source device) and the physical address may be part of a second address-occupant pair with a second occupant (e.g., as received from a second source device). In some implementations, the associations of the physical address with the plurality of occupants may be determined after standardizing the identifications of the physical addresses (e.g., one or both of the address or the sub-address).

In some implementations, the service notification platform 102 may use one or more fuzzy logic processes (e.g., many-valued logic processes to determine degrees of truth rather than simply true or false) to determine whether identifications of occupants are variations of the same occupant or different occupants. For example, the service notification platform 102 may use a fuzzy logic process to determine that "Best Toy Company" and "The Best Toy Company, Inc." are variations of the same occupant, but "The Tire Store" is a different occupant.

By detecting the association of the physical address with the plurality of occupants, the service notification platform 102 can detect a potential error within the first set of address-occupant pairs. The service notification platform 102 may then take steps to remove the errors to produce a refined, second set of address-occupant pairs. This may conserve computing and/or network resources that may otherwise be used to provide notification materials to incorrectly identified occupants of a building at a physical address and/or to provide notification materials to an entity that is not located at the physical address and does not have access to a service that is the subject of the notification materials.

Figure 1B:
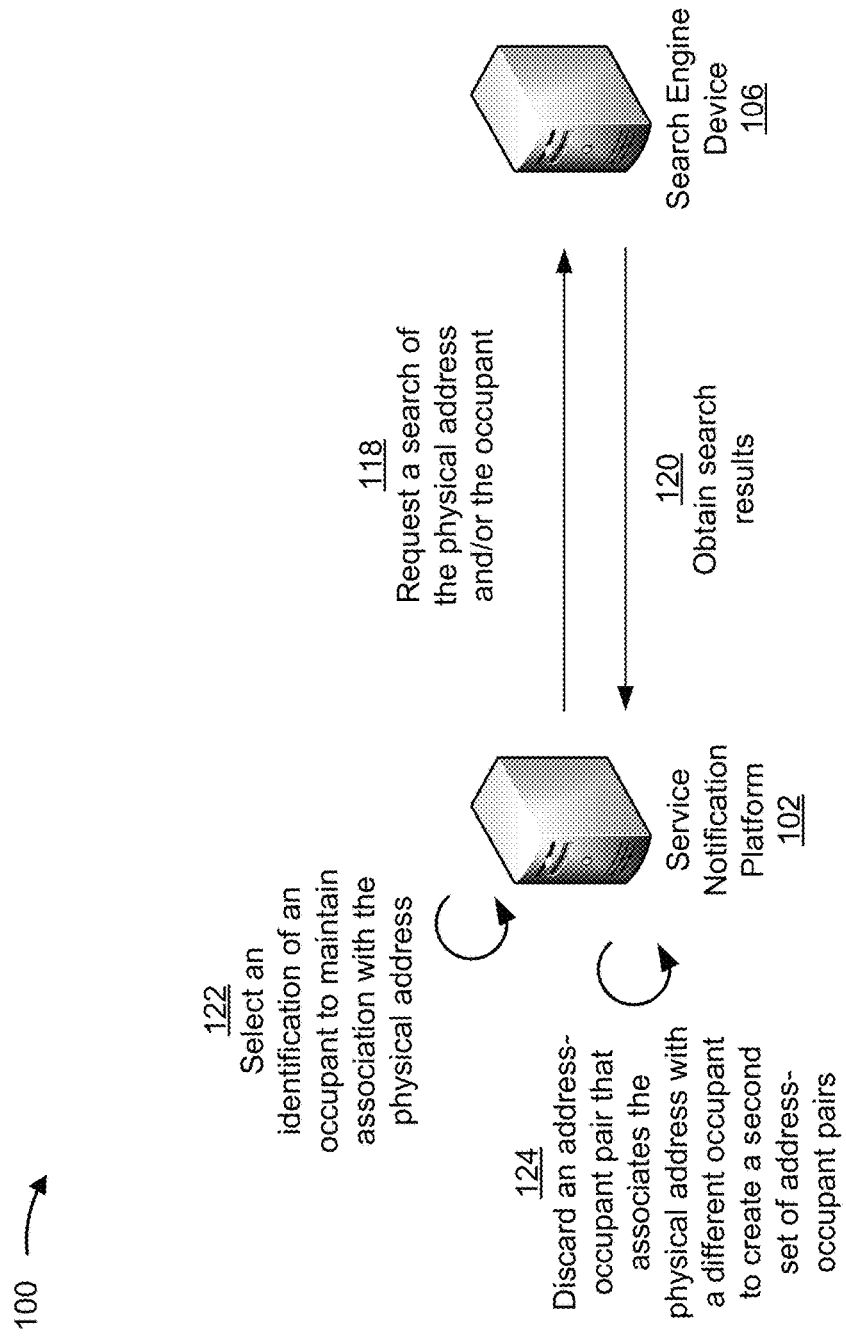

As shown in FIG. 1B, and by reference number 118, the service notification platform 102 may request a search based on the physical address, an identification of one or more of the identifications of the occupants that are associated with the physical address in the first set of address-occupant pairs, and/or the like. For example, the service notification platform 102 may perform one or more internet searches based on the physical address, the first occupant, and/or the second occupant by providing the request to the search engine device 106.

As shown by reference number 120, the service notification platform 102 may obtain search results from the search engine device 106. The search results may include results of one or more searches (e.g., having different search terms, different search parameters, and/or the like). In some implementations, the results include map-based results (e.g., a result of a search for an address and/or an occupant within a map or navigation service) that indicate a location of an occupant and/or an occupant at a location on a map.

By performing one or more searches based on the physical address and/or identifications of possible occupants, the service notification platform 102 may obtain additional information that can be used to improve a likelihood of selecting an accurate address-occupant pair. Having an accurate address-occupant pair can avoid using computing resources and/or networking resources to provide notification materials to an entity that does not have access to the services that are the subjects of the notification materials.

As shown by reference number 122, the service notification platform 102 may select an identification of an occupant to maintain association with the physical address. For example, the service notification platform 102 may select the first occupant to maintain association with the identification of the physical address. The service notification platform 102 may use sub-address keys to select the identification of the occupant to maintain association with the physical address.

In some implementations, the service notification platform 102 may select the identification of the occupant to maintain association with the physical address based on a quantity of the identifications of the plurality of the occupants that identify the first occupant. For example, if four address-occupant pairs including the physical address identify the first occupant and two of the address-occupant pairs including the physical address identify the second occupant, the service notification platform 102 may select the first occupant to maintain association with the physical address.

In some implementations, the service notification platform 102 may assign a confidence score to each selected identification of an occupant to maintain association with the physical address. In the example above, the service notification platform 102 may assign a confidence score of 67% (4/6) to the selection of the first occupant.

In some implementations, the service notification platform 102 may select the identification of the occupant to maintain association with the physical address based on a weighted scoring technique for analyzing the address-occupant pairs that identify the physical address. For example, the service notification platform 102 may assign values to the identifications of the occupants, and/or the associated applicant-occupant pairs, based on respective source devices from which the service notification platform 102 received the identifications of the occupants within the first set of address-occupant pairs. In some implementations, identifications of the occupants may receive a value based on a reliability score of the respective source devices from which the service notification platform 102 received the identifications of the occupants. A reliability score for a source device may be based on user input to the service notification platform 102, determined accuracy of historical identifications of occupants received from the source device, and/or the like.

In some implementations, the service notification platform 102 may determine accuracy of historical identifications of occupants based on a portion of historical identifications that match search results, match confirmations of occupants of a physical address (e.g., inputs by users that have been physically present to confirm an occupant of a physical address), match a majority or plurality of identifications of the plurality of source devices 104, and/or the like. The service notification platform 102 may use an accuracy determination model, trained using one or more machine learning processes with the historical identifications as inputs, to determine the values to assign to the identifications of the occupants such that relatively high values correspond to relatively high likelihoods of being accurate, based on historical identifications of occupants provided by the source devices from which the service notification platform 102 received the identifications of the occupants.

In implementations where the service notification platform 102 selects the identification of the occupant based on the weighted scoring technique, the service notification platform 102 may select the identification of the first occupant based on total values of the identifications of the plurality of the occupants. In an example of the weighted scoring technique, a first source device having a weight of 2, and a second source device having a weight of 2.3 may identify the first occupant as the occupant of the physical address. A third source device, having a weighted score of 0.5, a fourth source device, having a weighted score of 1.2, and a fifth source device, having a weighted score of 1.0, may identify the second occupant as the occupant of the physical address. The weighted scoring technique indicates that the first occupant should maintain association with the physical address based on a total score of identifications of the first occupant (4.3) being higher than the total score of identifications of the second occupant (2.7). In some implementations, one or more reliable source devices of the plurality of source devices 104 may be assigned a relatively high weighting such that, if the one or more reliable source devices provides an identification of the occupant of the physical address, the service notification platform 102 may have a high likelihood of maintaining association of the identification of the occupant, as identified by one or more reliable source devices, with the physical address. In this example of a weighted scoring technique, a confidence score for selecting the first occupant may be, for example, 61% (4.3/(4.3+2.7)).

In some implementations, the service notification platform 102 may use one or more machine learning processes to select the identification of the occupant to maintain association with the particular physical address. For example, the service notification platform 102 may use one or more artificial intelligence techniques, such as machine learning, deep learning, and/or the like to select the identification of an occupant to maintain association with the physical address. The service notification platform 102 may perform the one or more machine learning processes in connection with, or independently from, one or more of the techniques described above.

In some implementations, the service notification platform 102 may select the identification of the occupant to maintain association with the physical address using one or more inputs such as address-occupant pairs, historical accuracy of one or more source devices, geographical regions associated with an address in the address-occupant pairs, search results based on the physical address and/or the plurality of occupants, and/or the like. For example, the service notification platform 102 may train an occupant selection model using information that includes historical identifications of occupants from various source devices, related search results, and/or the like to select the identification of the occupant to maintain association with the physical address. As an example, the service notification platform 102 may determine that historical identifications of occupants from a particular source device are associated with a threshold probability of being an accurate identification of an occupant of a physical address. In some implementations, a determination of accuracy may be based on a verification process, such as receiving one or more inputs from a user that has been physically present to confirm an occupant, a user or user device that has received confirmation from the occupant, and/or the like.

In some implementations, the service notification platform 102 may use a scoring system (e.g., with relatively high scores and/or relatively low scores) to identify and/or classify parameters (e.g., inputs, combinations of inputs, and or the like) as being associated with one another. In this case, the service notification platform 102 may determine that a relatively high score (e.g., as being likely to influence the accuracy of an identification of an occupant) is to be assigned to parameters that are determined to be the same or similar as previously identified parameters that influenced the accuracy of identifications of occupants of physical addresses. In contrast, the service notification platform 102 may determine that a relatively low score (e.g., as being unlikely to influence the accuracy of an identification of an occupant) is to be assigned to parameters that are determined to be different than previously identified parameters that influenced the accuracy of identifications of occupants of physical addresses.

In some implementations, the service notification platform 102 may perform a training operation when generating the occupant selection model. For example, the service notification platform 102 may portion historical identifications of occupants and associated parameters into a training set (e.g., a set of data to train the occupant selection model), a validation set (e.g., a set of data used to evaluate a fit of the occupant selection model and/or to fine tune the occupant selection model), a test set (e.g., a set of data used to evaluate a final fit of the occupant selection model), and/or the like. In some implementations, the service notification platform 102 may preprocess and/or perform dimensionality reduction to reduce the historical identifications of occupants and the associated parameters to a minimum feature set. In some implementations, the service notification platform 102 may train the occupant selection model on this minimum feature set, thereby reducing processing to train the occupant selection model, and may apply a classification technique to the minimum feature set.

In some implementations, service notification platform 102 may use a classification technique, such as a logistic regression classification technique, a random forest classification technique, a gradient boosting machine learning (GBM) technique, and/or the like, to determine a categorical outcome (e.g., that a parameter associated with an identification of an occupant corresponds to accuracy, that the parameter associated with the identification of an occupant does not correspond to accuracy, and/or the like). Additionally, or alternatively, the service notification platform 102 may use a naïve Bayesian classifier technique. In this case, the service notification platform 102 may perform binary recursive partitioning to split the data of the minimum feature set into partitions and/or branches and use the partitions and/or branches to perform predictions (e.g., that a parameter associated with the identification of an occupant corresponds to accuracy). Based on using recursive partitioning, the service notification platform 102 may reduce utilization of computing resources relative to manual, linear sorting and analysis of data items, thereby enabling use of thousands, millions, or billions of data items to train a model, which may result in a more accurate model than using fewer data items.

Additionally, or alternatively, the service notification platform 102 may use a support vector machine (SVM) classifier technique to generate a non-linear boundary between data items in the training set. In this case, the non-linear boundary is used to classify test data (e.g., data relating to a source of an identification of the occupant, associated parameters, and/or the like) into a particular class (e.g., a class indicating that a parameter is likely to indicate that the identification of the occupant is likely to be accurate, that a parameter is likely to indicate that the identification of the occupant is unlikely to be accurate, and/or the like).

Additionally, or alternatively, the service notification platform 102 may train the occupant selection model using a supervised training procedure that includes receiving input to the occupant selection model from a subject matter expert, which may reduce an amount of time, an amount of processing resources, and/or the like to train the occupant selection model relative to an unsupervised training procedure. In some implementations, the service notification platform 102 may use one or more other model training techniques, such as a neural network technique, a latent semantic indexing technique, and/or the like. For example, the service notification platform 102 may perform an artificial neural network processing technique (e.g., using a two-layer feedforward neural network architecture, a three-layer feedforward neural network architecture, and/or the like) to perform pattern recognition with regard to patterns of whether parameters associated with historical identifications of occupants are likely to indicate that the identifications of occupants are accurate, are likely to indicate that the identifications of occupants are inaccurate, and/or the like. In this case, using the artificial neural network processing technique may improve an accuracy of the occupant selection model generated by the service notification platform 102 by being more robust to noisy, imprecise, or incomplete data, and by enabling the service notification platform 102 to detect patterns and/or trends undetectable to human analysts or systems using less complex techniques.

As an example, the service notification platform 102 may use a supervised multi-label classification technique to train the occupant selection model. For example, as a first step, the service notification platform 102 may map parameters to accuracy of identifications of occupants. In this case, the parameters may be characterized as corresponding to accurate identifications of occupants, based on characteristics of the parameters (e.g., whether a characteristic of a parameter is similar or associated with accurate identifications of occupants) and an analysis of the parameters (e.g., by a technician, thereby reducing processing relative to the service notification platform 102 being required to analyze each activity).

As a second step, the service notification platform 102 may determine classifier chains, whereby labels of target variables may be correlated (e.g., in this example, labels may be parameters, and correlation may refer to a common characteristic of the parameters in similarly accurate identifications of occupants). In this case, the service notification platform 102 may use an output of a first label as an input for a second label (as well as one or more input features, which may be other data relating to the identifications of occupants), and may determine a likelihood that a particular parameter that includes a set of characteristics (some of which are associated with historical identifications of occupants that were determined to be accurate, and some of which are associated with historical identifications of occupants that were determined to be inaccurate) is associated with accuracy of identifications of occupants based on a similarity to other parameters that include similar characteristics. In this way, the service notification platform 102 transforms classification from a multilabel-classification problem to multiple single-classification problems, thereby reducing processing utilization. As a third step, the service notification platform 102 may determine a Hamming Loss Metric relating to an accuracy of a label in performing a classification by using the validation set of the data. For example, an accuracy with which a weighting is applied to each parameter and whether each parameter is associated with an accurate or an inaccurate identification of an occupant, results in a correct prediction of whether an identification of an occupant is accurate, thereby accounting for differing amounts to which association of any one parameter influences the accuracy of the identification of the occupant. As a fourth step, the service notification platform 102 may finalize the occupant selection model based on labels that satisfy a threshold accuracy associated with the Hamming Loss Metric and may use the occupant selection model for subsequent prediction of whether parameters of an identification of an occupant are to result in the identification of the occupant being accurate.

As another example, the service notification platform 102 may determine, using a linear regression technique, that a threshold percentage of parameters, in a set of parameters, do not correspond to accuracy of an identification of an occupant, and may determine that those parameters are to receive relatively low association scores. In contrast, the service notification platform 102 may determine that another threshold percentage of parameters correspond to accuracy (indicating accuracy or inaccuracy) and may assign a relatively high association score to those parameters. Based on the parameters corresponding to accuracy of an identification of an occupant, the service notification platform 102 may generate the occupant selection model and may use the occupant selection model for analyzing new parameters that the service notification platform 102 identifies.

In some implementations, a different device, such as a server device, may generate and train the occupant selection model. The different device may send the occupant selection model for use by the service notification platform 102. The different device may update and send (e.g., on a scheduled basis, on an on-demand basis, on a triggered basis, on a periodic basis, and/or the like) the occupant selection model to the service notification platform 102.

Accordingly, the service notification platform 102 may use any number of artificial intelligence techniques, machine learning techniques, deep learning techniques, and/or the like to select an identification of an occupant to maintain association with the physical address.

As shown by reference number 124, the service notification platform 102 may discard, from the first set of address-occupant pairs, one or more address-occupant pairs that associate the physical address with an identification of an occupant that is not the selected identification of the occupant. For example, the service notification platform 102 may discard one or more address-occupant pairs that include an identification of the second occupant. In some implementations, the service notification platform 102 may discard one or more address-occupant pairs that associate a sub-address key (e.g., assigned to the physical address) with the identification of an occupant that is not the selected identification of the occupant.

By selecting the identification of the occupant to maintain association with the physical address and discarding conflicting identifications of occupants (and/or associated address-occupant pairs) the service notification platform 102 may create a second set of address-occupant pairs. The second set of address-occupant pairs may have a reduced quantity of conflicting address-occupant pairs, may include identifications of physical addresses that have improved accuracy, and/or the like. The second set of address-occupant pairs may improve efficiency in providing notification materials associated with service status, available services, and/or the like. Using the second set of address-occupant pairs may avoid using computing and/or network resources to send notifications to entities associated with the conflicting address-occupant pairs, which may be unlikely to be at the physical address and which may not be users of the service or have access to associated infrastructure to provide the services that are the subjects of the notification.

Figure 1C:
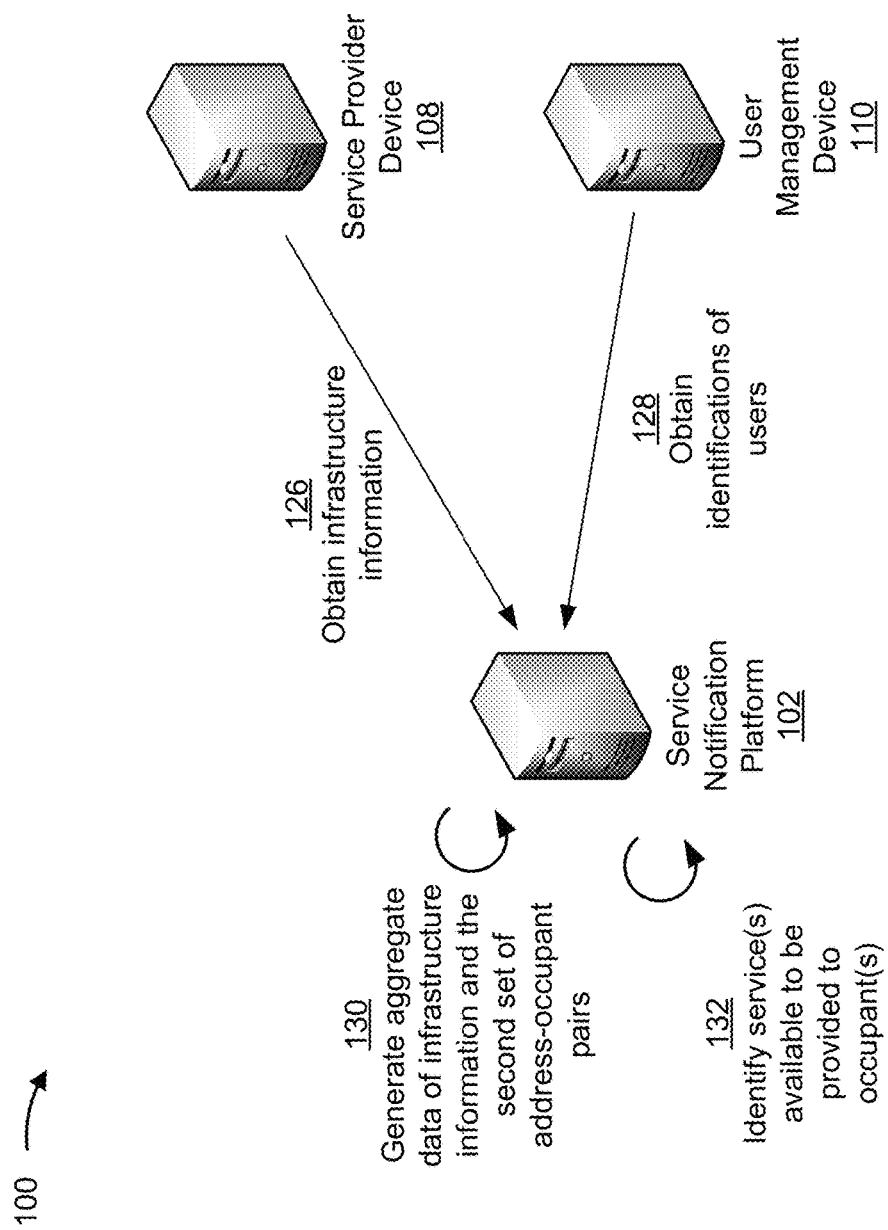

As shown in FIG. 1C, and by reference number 126, the service notification platform 102 may obtain infrastructure information from the service provider device 108. The infrastructure information may indicate one or more services that are available to be provided at physical addresses (e.g., one or more of the physical addresses identified in the second set of address-occupant pairs).

In some implementations, the infrastructure information lists physical addresses (e.g., associated with an address-key) that have access to the infrastructure associated with the service provider (e.g., through which the service provider may provide services). In some implementations, the infrastructure information may list ranges of physical addresses that have access to the infrastructure (e.g., 100-500 N Main St.). Additionally, or alternatively, the infrastructure information may identify geographical regions that have access to the infrastructure, or for which a cost to provide access would be relatively inexpensive (e.g., based on being within a threshold distance from existing physical infrastructure).

The infrastructure may comprise one or more physical systems such as fiberoptic cables, metal-based cables, plumbing pipes, electrical lines, on-premises or near-premises equipment, and/or the like. When the infrastructure comprises one or more physical systems, an occupant may gain access to a service from the service provider by connecting to the infrastructure. The infrastructure may comprise one or more ranged components, such as a network node configured to provide wireless communication (e.g., a cell of a wireless network). When the infrastructure comprises one or more ranged components, the occupant may gain access to a service from the service provider via a wireless connection between physical systems (e.g., an air interface).

As shown by reference number 128, the service notification platform 102 may obtain identifications of users from the user management device 110. For example, the identifications of users may include one or more identifications of entities (e.g., occupants), identifications of one or more services to which the user are or were subscribed, identifications of physical addresses of the users at which the service provider provides or has provided services, and/or the like. For example, the identifications of users may include an entity name (e.g., "Entity A"), a service currently provided via the infrastructure (e.g., fiberoptic-based internet services), and one or more addresses of the entity at which the service is currently provided (e.g., 123 Main St., Arlington, VA and 321 South State St., Fairfax, VA). The identifications of users may identify additional addresses of the entity at which the service is not provided (e.g., at which a different service is provided or at which the service had previously been provided).

The service notification platform 102 may determine one or more associations between the users and one or more occupants in the second set of address-occupant pairs, for which one or more services are available to be provided by the service provider. In this way, the service notification platform 102 may efficiently identify notifications for service status and service availability (e.g., notifications with a relatively high likelihood of being meaningful to the recipient). For example, an existing user of a service at one physical address may be relatively likely (e.g., when compared to the general public) to desire notifications for service availability at another physical address associated with the user. This association information may be used to conduct efficient notifications of specific available services and locations, which may conserve computing and networking resources that may otherwise be used for doing notifications in a wide, general fashion that may not be relevant to many of the recipients.

The service notification platform 102 may perform updates to the second set of address-occupant pairs (e.g., perform a process of selecting an identification of an occupant to maintain association with the physical address). The service notification platform 102 may perform updates based on trigger events such as expiration of a time period from a most recent update for a particular physical address, expiration of a time period from a most recent update of the second set of address-occupant pairs (e.g., daily, weekly, monthly, quarterly, or yearly updates), reception of an indication that a previously selected occupant of a physical address is not the actual occupant of the physical address, reception of new and/or replacement address-occupant pairs from one or more of the plurality of source devices 104, and/or the like. In some implementations, the service notification platform 102 may perform updates based on receiving input from a user device. For example, the service notification platform 102 may perform updates based on receiving a request for notifications related to a particular available service at a particular address, within a range of addresses, within a geographical region, and/or the like.

By performing updates to the second set of address-occupant pairs based on trigger events, the second set of address-occupant pairs may be adaptable to changed information and may maintain the second set of address-occupant pairs with an improved accuracy when compared to a static determination of the second set of address-occupant pairs.

As shown by reference number 130, the service notification platform 102 may generate aggregate data that includes infrastructure information and the second set of address-occupant pairs. The aggregate data may be used to identify one or more services that are available (e.g., based on the infrastructure information) at one or more physical addresses that are identified in the second set of address-occupant pairs. The aggregate data may also be used to identify occupants that are associated with the one or more physical addresses at which the one or more services are available. In some implementations, the identifications of users may be included in the aggregate data to further identify one or more physical addresses associated with an existing or former users at which infrastructure makes one or more services available to be provided.

As shown by reference number 132, the service notification platform 102 may identify one or more services that are available to be provided to one or more occupants. For example, the service notification platform 102 may use the aggregate data to identify a service that is not currently provided to an occupant of a physical address that has access to the infrastructure. In some implementations, the service notification platform 102 may identify a service to be included in a notification based on one or more characteristics of the occupant. For example, if the occupant is associated with an entity that is a current or former user, the service notification platform 102 may identify the service provided to the entity at a different physical address.

In some implementations, the service notification platform 102 may use one or more machine learning processes, as discussed herein, to generate a model for selecting services to provide to occupants. The model may be trained using inputs associated with historical selections of services provided to occupants, such as geographical regions of the physical addresses, types of businesses operated by the occupants, and/or the like.

The service notification platform 102 may provide an interface (e.g., an application programming interface, an interactive website, and/or the like) to provide access to the second set of address-occupant pairs, the aggregate data, the identified services that are available to be provided to the one or more occupants, and/or the like. For example, a service system associated with the service provider may provide a query using the interface for prospective and/or existing users within an address range that has access to existing infrastructure of the service provider. The service notification platform 102 may query a data structure storing the one or more application-occupant pairs based on addresses that are within the address range and/or within the address range and also having access to existing infrastructure of the service provider. The service notification platform 102 may provide the results of the query in an organized and/or filtered format. For example, the service notification platform 102 may provide the results of the query in an ordered list based on a likelihood of relevance of an associated notification of the services to the occupants associated with the addresses that are within the address range. The results may include information such as types of infrastructure, capabilities of the infrastructure (e.g., a quantity of available ports), identifications of available services, information about the prospective and/or existing users (e.g., an occupant type, a business type, and/or the like), and/or the like. The results may be provided in any format typically used to return a result from an interface, such as JSON, XML, HTML, and the like.

By providing the interface to access the second set of address-occupant pairs, a user device associated with the service provider may identify recommendations of prospective and/or existing users for efficient notifications related to services associated with the infrastructure. This may also conserve networking and computing resources that might otherwise be used to generate and provide notification materials to entities that do not have access to the infrastructure.

Figure 1D:
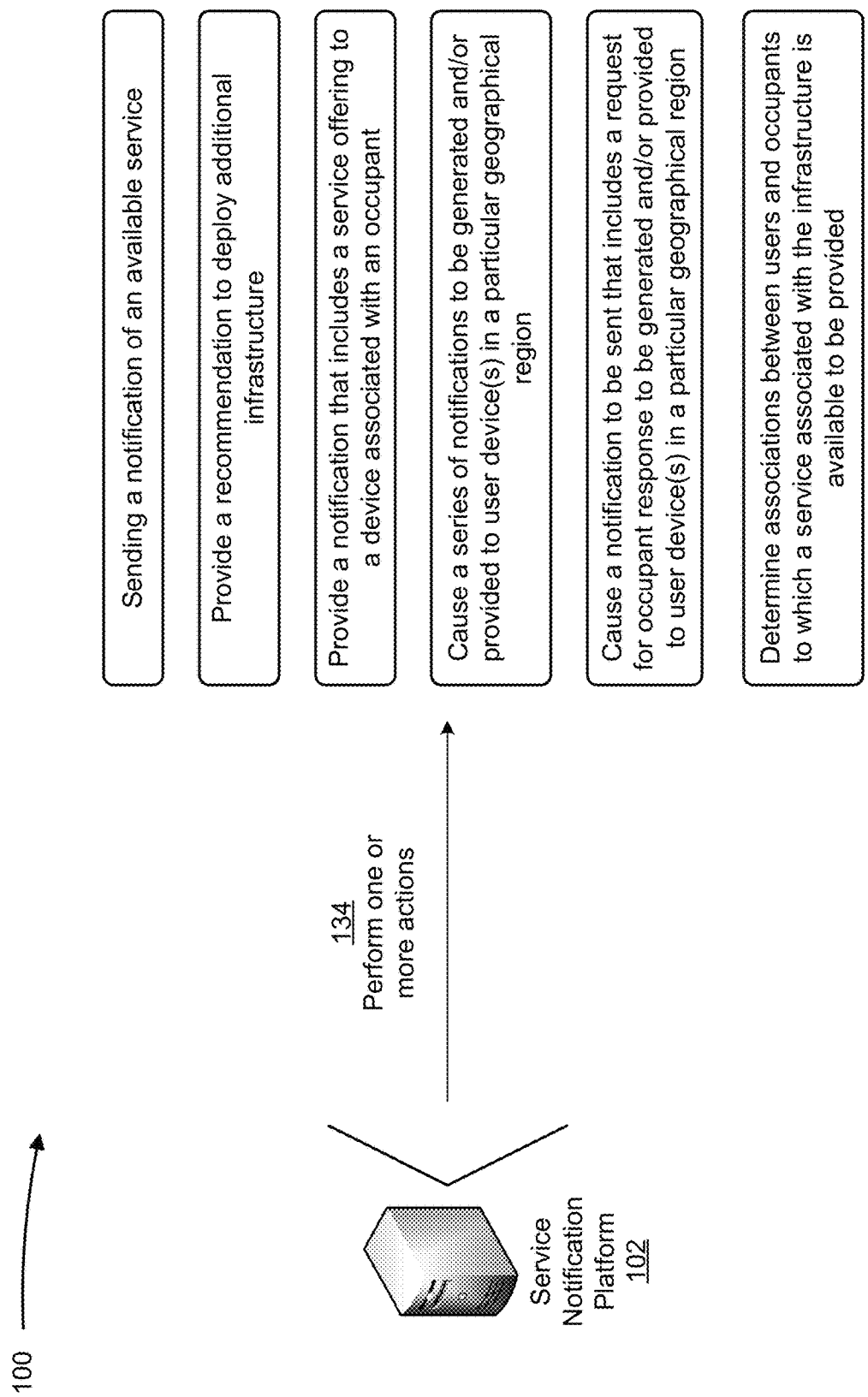

As shown in FIG. 1D, and by reference number 134, the service notification platform 102 may perform one or more actions. In some implementations, the service notification platform 102 may perform one or more actions based on identifying the one or more services being provided or available to be provided at the one or more physical locations.

The one or more actions may include sending a notification of an available service. For example, the service notification platform 102 may provide a notification of the availability of one or more services to one or more user devices associated with the one or more occupants for which the one or more services are available to be provided via the infrastructure. In some implementations, the service notification platform 102 may provide the notification based on identification of one or more services that are available to be provided to the one or more of the occupants. In some implementations, the service notification platform 102 may provide the notification based on one or more associations between the one or more occupants and one or more users identified in the identifications of users.

In some implementations, the service notification platform 102 may provide a list of one or more notifications related to a service to display via the user device (e.g., a user device associated with the service provider). The list may be prioritized based on likelihood of relevance to the user of the notification, for example, based on the user's subscription to the service or the availability of the service at a location associated with the user. The likelihood of relevance may be determined using a model trained using one or more machine learning processes that have been trained using inputs such as historical outcomes of providing notifications to user devices and associated parameters (e.g., whether the occupants are associated with current users, types of services, geographical regions associated with the physical addresses, types of businesses operated by the occupants, and/or the like).

The one or more actions may include providing a recommendation to deploy additional infrastructure. For example, the service notification platform 102 may determine that deploying additional infrastructure on one or more streets or in a geographical region would provide access to a threshold quantity of occupants with a threshold likelihood of relevance of interest in a service. In some implementations, the service notification platform 102 may provide the recommendation to deploy the additional infrastructure based on one or more associations between at least one occupant of the second set of address-occupant pairs, for which the one or more services are not available to be provided, and one or more users identified in the identifications of users.

In some implementations, the service notification platform 102 may determine the likelihood of relevance of a notification based on historical outcomes of providing notifications related to the service for similar occupants. In some implementations, the service notification platform 102 may use a model trained using one or more machine learning processes to determine a likelihood that a notification to a prospective user (e.g., the occupants that would gain access to the service from the additional infrastructure) would be relevant to the prospective user (and in some cases the likelihood the prospective user would choose to subscribe to the service). The service notification platform 102 or another device may train the model with inputs such as types of businesses operated by the occupants, geographical regions associated with the physical addresses, demographics of geographical regions associated with the physical addresses, economic indicators of the geographical regions associated with the physical addresses, population growth of the geographical regions associated with the physical addresses, and/or the like.

The one or more actions may include providing a notification that includes a service offering to a device associated with an occupant. For example, the service notification platform 102 may provide a notification that includes information related to an available service to a device associated with the one or more occupants for which the service is available to be provided via the infrastructure. The notification may exclude those occupants that are already indicated as users of the service, or may include different information related to the service depending on the user's status (e.g., service levels, usage levels).

The one or more actions may include causing a series of notifications to be generated and/or provided to one or more user devices in a particular geographical region. For example, the service notification platform 102 may generate, or provide information to cause another device to generate, notifications to one or more user devices associated with the occupants for which the one or more services are provided or are available to be provided via the infrastructure. In some implementations, the notification may provide information on different services based on types of businesses operated by the occupants, types of infrastructure available at the physical addresses of the occupants, and/or the like. For example, users that currently subscribe to the service may receive information related to upcoming changes in the services (e.g., improvements, service outages), while prospective users may receive information related to service availability and capabilities.

The one or more actions may include causing a notification to be sent that includes a request for occupant response to be generated and/or provided to one or more user devices in a particular geographical region. For example, the service notification platform 102 may generate, or provide information to cause another device to generate, a notification to a user device associated with an occupant requesting that the occupant respond with certain information, such as confirmation of address or other information associated with a user, confirmation of the presence of infrastructure at the address, feedback on services provided, desire for services, and the like. Responses to the occupant satisfaction survey may be used to validate and train address information determinations described above, inform recommendations to deploy additional infrastructure to support additional service availability, and/or the like.

The one or more actions may include determining associations between users (e.g., current and/or former users) and occupants to which a service associated with the infrastructure is available to be provided. As described above, the associations may be included with the aggregate data. In other implementations, the associations may be determined after generating the aggregate data.

As described above, by generating the aggregate data of infrastructure information and the second set of address-occupant pairs, having improved accuracy relative to the first set of address-occupant pairs received from the plurality of source devices 104, the service notification platform 102 is able to perform one or more actions to assist in efficient use of computing and/or network resources to generate and/or provide notifications for entities that have access to an associated service via infrastructure. Using the aggregate data for notifications avoids consumption of computing and/or network resources that would otherwise be wasted in notification efforts provided for entities that do not have access to the associated service via the infrastructure.

As indicated above, FIGS. 1A-1D are provided merely as one or more examples. Other examples may differ from what is described with regard to FIGS. 1A-1D. For example, in practice, there may be networks between the devices, additional devices, fewer devices, different devices, or differently arranged devices than those shown in FIGS. 1A-1D.

Figure 2:
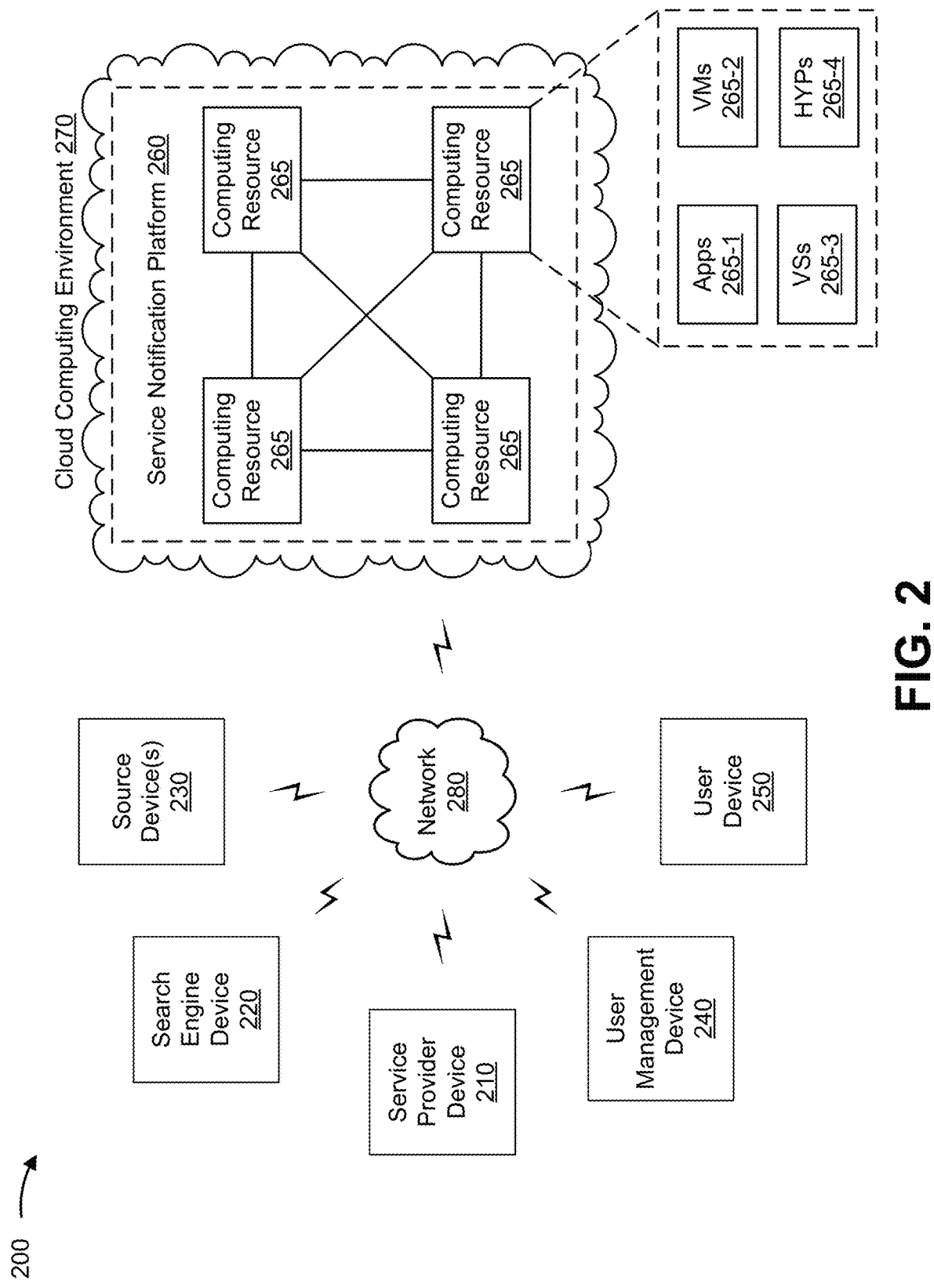
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a service provider device 210, a search engine device 220, a source device 230, a user management device 240, a user device 250, a service notification platform 260, a computing resource 265, a cloud computing environment 270, and a network 280. Devices of environment 200 may interconnect via wired connections, wireless connections, or a combination of wired and wireless connections.

Service provider device 210 (e.g., the service provider device 108) includes one or more devices capable of receiving, storing, processing, and/or routing information associated with generating and/or providing infrastructure information to service notification platform 260. In some implementations, service provider device 210 may include a communication interface that allows service provider device 210 to receive information from and/or transmit information to other devices in environment 200. For example, service provider device 210 may use the communication interface to provide the infrastructure information to service notification platform 260.

Search engine device 220 (e.g., the service provider device 108) includes one or more devices capable of receiving, storing, processing, and/or routing information associated with executing a search. Search engine device 220 may be configured to crawl a corpus of documents (e.g., web documents, maps, and/or the like), index the documents, and store information associated with the documents in a repository of documents. When executing the search, search engine device 220 may search the corpus of documents, the index of the documents, the repository of documents, and/or the like. In some implementations, search engine device 220 may include a communication interface that allows search engine device 220 to receive information from and/or transmit information to other devices in environment 200. For example, search engine device 220 may use the communication interface to receive search terms (e.g., identifications of addresses and/or identifications of occupants) from service notification platform 260 and provide search results to service notification platform 260.

Source device 230 (e.g., one of the plurality of source devices 104) includes one or more devices capable of receiving, storing, processing, and/or routing information associated with generating and/or providing address-occupant pairs to service notification platform 260. In some implementations, source device 230 may include a communication interface that allows source device 230 to receive information from and/or transmit information to other devices in environment.

User management device 240 (e.g., the user management device 110) includes one or more devices capable of receiving, storing, processing, and/or routing information associated with storing, generating, and/or providing identifications of users associated with the service provider. In some implementations, user management device 240 may include a communication interface that allows user management device 240 to receive information from and/or transmit information to other devices in environment.

User device 250 includes one or more devices capable of receiving, generating, storing, processing, and/or providing information associated with receiving notifications from service notification platform 260. For example, user device 250 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Service notification platform 260 includes one or more computing resources assigned to identify systems and methods for identifying available services at a physical address. For example, service notification platform 260 may be a platform implemented by cloud computing environment 270 that may identify available services at the physical address. In some implementations, service notification platform 260 is implemented by computing resources 265 of cloud computing environment 270.

Service notification platform 260 may include a server device or a group of server devices. In some implementations, service notification platform 260 may be hosted in cloud computing environment 270. Notably, while implementations described herein may describe service notification platform 260 as being hosted in cloud computing environment 270, in some implementations, service notification platform 260 may be non-cloud-based or may be partially cloud-based.

Cloud computing environment 270 includes an environment that delivers computing as a service, whereby shared resources, services, and/or the like may be provided to identify available services at a physical address. Cloud computing environment 270 may provide computation, software, data access, storage, and/or other services that do not require end-user knowledge of a physical address and configuration of a system and/or a device that delivers the services. As shown, cloud computing environment 270 may include service notification platform 260 and computing resource 265.

Computing resource 265 includes one or more personal computers, workstation computers, server devices, or another type of computation and/or communication device. In some implementations, computing resource 265 may host service notification platform 260. The cloud resources may include compute instances executing in computing resource 265, storage devices provided in computing resource 265, data transfer devices provided by computing resource 265, and/or the like. In some implementations, computing resource 265 may communicate with other computing resources 265 via wired connections, wireless connections, or a combination of wired and wireless connections.

As further shown in FIG. 2, computing resource 265 may include a group of cloud resources, such as one or more applications ("APPs") 265-1, one or more virtual machines ("VMs") 265-2, virtualized storage ("VSs") 265-3, one or more hypervisors ("HYPs") 265-4, or the like.

Application 265-1 includes one or more software applications that may be provided to or accessed by user device 250. Application 265-1 may eliminate a need to install and execute the software applications on user device 250. For example, application 265-1 may include software associated with service notification platform 260 and/or any other software capable of being provided via cloud computing environment 270. In some implementations, one application 265-1 may send/receive information to/from one or more other applications 265-1, via virtual machine 265-2.

Virtual machine 265-2 includes a software implementation of a machine (e.g., a computer) that executes programs like a physical machine. Virtual machine 265-2 may be either a system virtual machine or a process virtual machine, depending upon use and degree of correspondence to any real machine by virtual machine 265-2. A system virtual machine may provide a complete system platform that supports execution of a complete operating system ("OS"). A process virtual machine may execute a single program and may support a single process. In some implementations, virtual machine 265-2 may execute on behalf of a user (e.g., user device 250), and may manage infrastructure of cloud computing environment 270, such as data management, synchronization, or long-duration data transfers.

Virtualized storage 265-3 includes one or more storage systems and/or one or more devices that use virtualization techniques within the storage systems or devices of computing resource 265. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 265-4 provides hardware virtualization techniques that allow multiple operating systems (e.g., "guest operating systems") to execute concurrently on a host computer, such as computing resource 265. Hypervisor 265-4 may present a virtual operating platform to the guest operating systems and may manage the execution of the guest operating systems. Multiple instances of a variety of operating systems may share virtualized hardware resources.

Network 280 includes one or more wired and/or wireless networks. For example, network 280 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
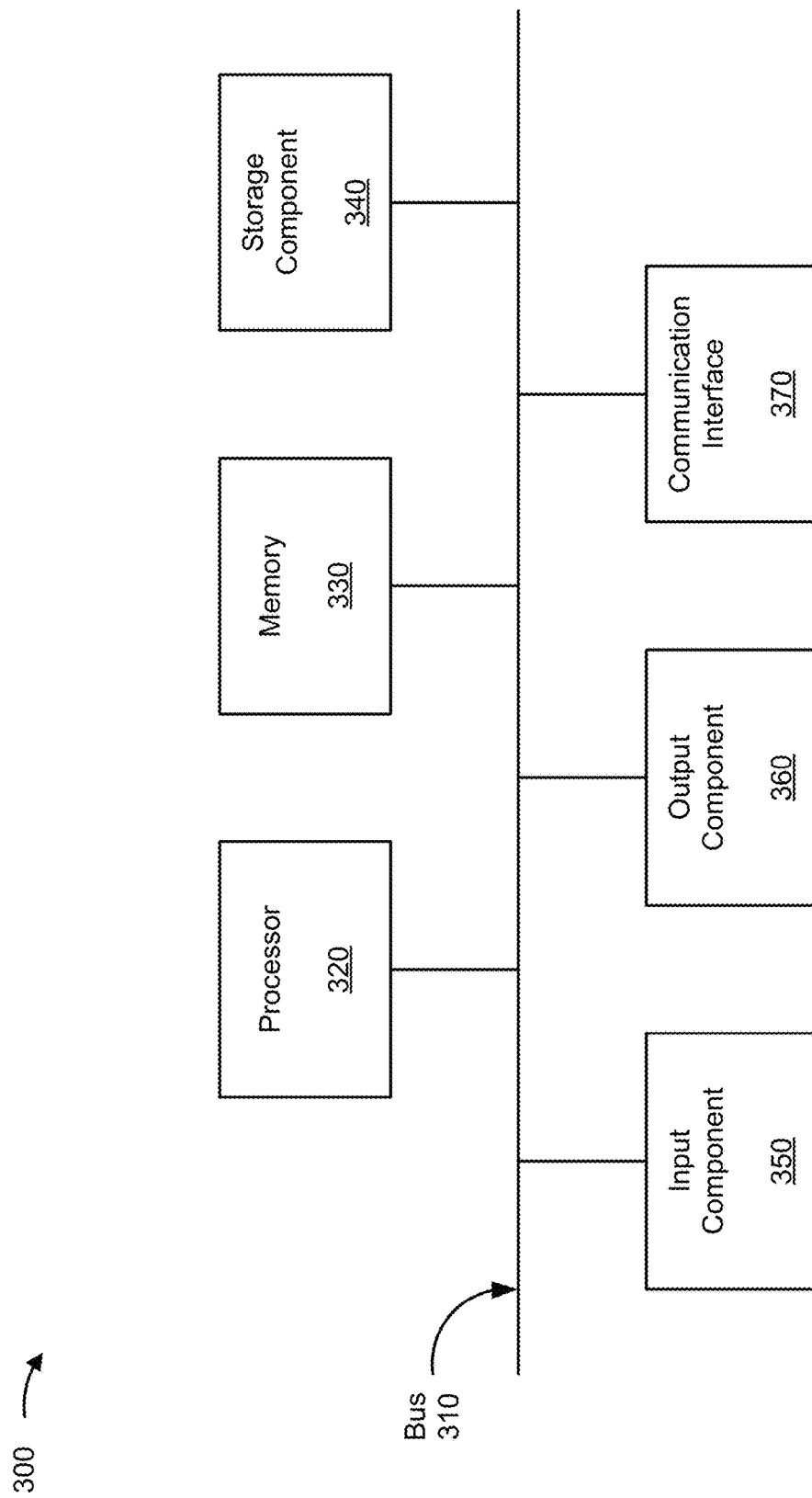
FIG. 3 is a diagram of example components of one or more devices of FIG. 2.

FIG. 3 is a diagram of example components of a device 300. Device 300 may correspond service provider device 210, search engine device 220, source device 230, user management device 240, user device 250, service notification platform 260, and/or computing resource 265. In some implementations, service provider device 210, search engine device 220, source device 230, user management device 240, user device 250, service notification platform 260, and/or computing resource 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
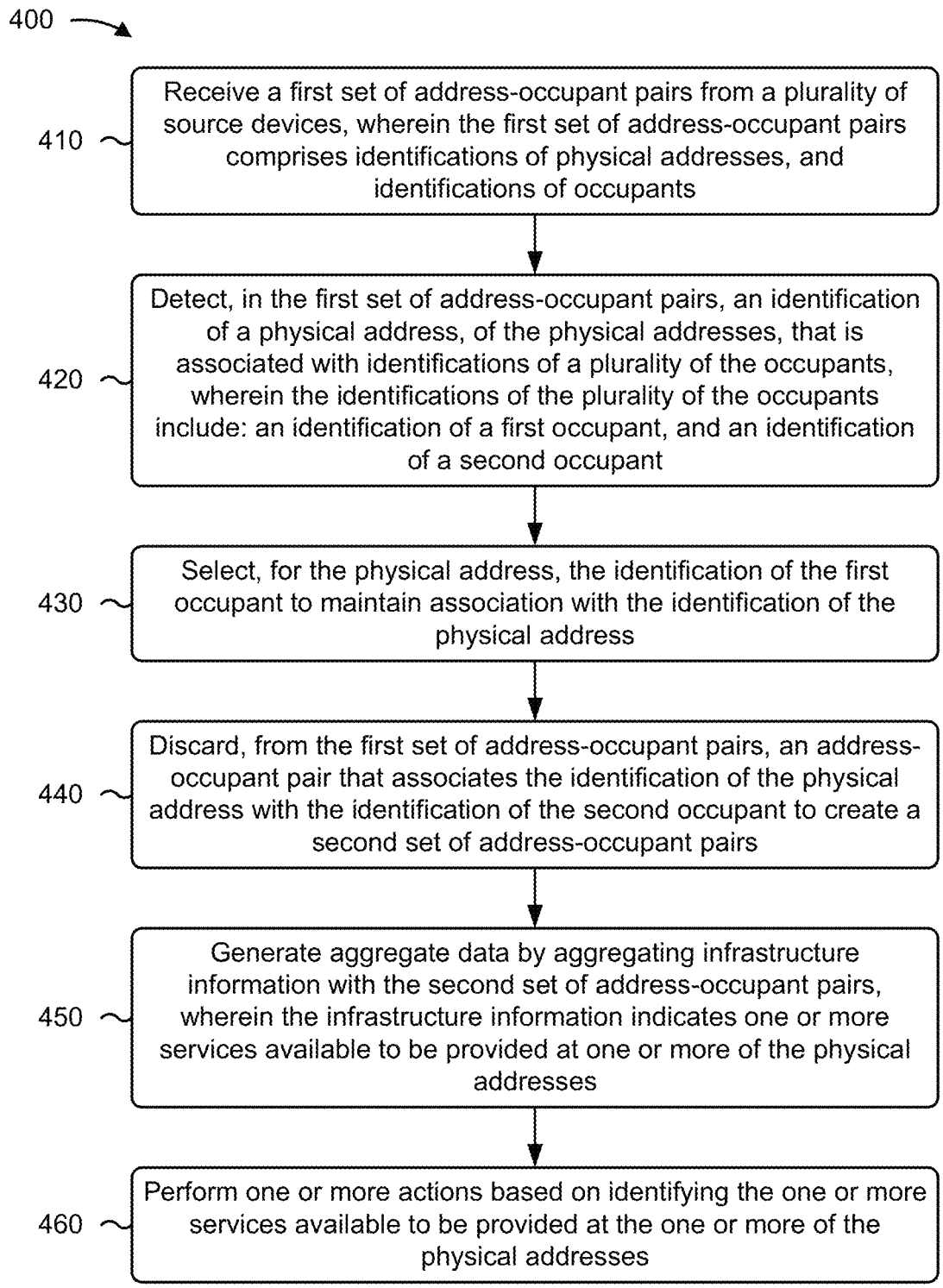
FIG. 4 is a flow chart of an example process for identifying available services at a physical address.

FIG. 4 is a flow chart of an example process 400 for systems and methods for identifying available services at a physical address. In some implementations, one or more process blocks of FIG. 4 may be performed by a service notification platform (e.g., service notification platform 260). In some implementations, one or more process blocks of FIG. 4 may be performed by another device or a group of devices separate from or including the service notification platform, such as a service provider device (e.g., service provider device 210), a search engine device (e.g., search engine device 220), a source device (e.g., source device 230), a user management device (e.g., user management device 240), a user device (e.g., user device 250), and/or a computing resource (e.g., computing resource 265), and/or the like.

As shown in FIG. 4, process 400 may include receiving a first set of address-occupant pairs from a plurality of source devices (block 410). For example, the service notification platform (e.g., using computing resource 265, processor 320, memory 330, storage component 340, input component 350, output component 360, communication interface 370 and/or the like) may receive a first set of address-occupant pairs from a plurality of source devices, as described above. In some aspects, the first set of address-occupant pairs comprises identifications of physical addresses, and identifications of occupants.

In some implementations, process 400 includes translating the identifications of the physical addresses into standardized identifications of the physical addresses. In some implementations, process 400 may include assigning, to the identifications of the physical addresses, address keys and sub-address keys. An address key may be associated with a building address and a sub-address key may be associated with a unit within the building address.

As further shown in FIG. 4, process 400 may include detecting, in the first set of address-occupant pairs, an identification of a physical address that is associated with identifications of a plurality of the occupants (block 420). For example, the service notification platform (e.g., using computing resource 265, processor 320, memory 330, storage component 340, input component 350, output component 360, communication interface 370 and/or the like) may detect, in the first set of address-occupant pairs, an identification of a physical address, of the physical addresses, that is associated with identifications of a plurality of the occupants, as described above. In some aspects, the identifications of the plurality of the occupants include an identification of a first occupant, and an identification of a second occupant.

As further shown in FIG. 4, process 400 may include selecting, for the physical address, the identification of the first occupant to maintain association with the identification of the physical address (block 430). For example, the service notification platform (e.g., using computing resource 265, processor 320, memory 330, storage component 340, input component 350, output component 360, communication interface 370 and/or the like) may select, for the physical address, the identification of the first occupant to maintain association with the identification of the physical address, as described above. In some implementations, the selection of the identification of the first occupant is based on sub-address keys.

In some implementations, selecting the identification of the first occupant comprises selecting the identification of the first occupant based on a quantity of the identifications of the plurality of the occupants that identify the first occupant. Process 400 may include determining the quantity of the identifications of the plurality of the occupants that identify the first occupant using a fuzzy logic process.

In some implementations, selecting the identification of the first occupant comprises performing one or more internet searches based on at least one of the physical address, the identification of the first occupant, or the identification of the second occupant. Selecting the identification of the first occupant may further comprise selecting the second set of address-occupant pairs based on search results of the one or more internet searches.

In some implementations, process 400 may include assigning values to the identifications of the plurality of the occupants based on respective source devices, of the plurality of source devices, from which the service notification platform received the identifications of the plurality of occupants within the first set of address-occupant pairs. Selecting the identification of the first occupant may then comprise selecting the identification of the first occupant based on total values of the identifications of the plurality of the occupants. In some implementations, assigning the values to the identifications of the plurality of the occupants comprises determining the values using a model trained using one or more machine learning processes.

As further shown in FIG. 4, process 400 may include discarding, from the first set of address-occupant pairs, an address-occupant pair that associates the identification of the physical address with the identification of the second occupant to create a second set of address-occupant pairs (block 440). For example, the service notification platform (e.g., using computing resource 265, processor 320, memory 330, storage component 340, input component 350, output component 360, communication interface 370 and/or the like) may discard, from the first set of address-occupant pairs, an address-occupant pair that associates the identification of the physical address with the identification of the second occupant to create a second set of address-occupant pairs, as described above.

As further shown in FIG. 4, process 400 may include generating aggregate data by aggregating infrastructure information with the second set of address-occupant pairs (block 450). For example, the service notification platform (e.g., using computing resource 265, processor 320, memory 330, storage component 340, input component 350, output component 360, communication interface 370 and/or the like) may generate aggregate data by aggregating infrastructure information with the second set of address-occupant pairs, as described above. In some implementations, the infrastructure information indicates one or more services available to be provided at one or more of the physical addresses. In some implementations, generation of the aggregate data is based on address keys.

As further shown in FIG. 4, process 400 may include performing one or more actions based on identifying the one or more services available to be provided at the one or more of the physical addresses (block 460). For example, the service notification platform (e.g., using computing resource 265, processor 320, memory 330, storage component 340, input component 350, output component 360, communication interface 370 and/or the like) may perform one or more actions based on identifying the one or more services available to be provided at the one or more of the physical addresses, as described above.

Process 400 may include additional implementations, such as any single implementation or any combination of implementations described below and/or in connection with one or more other processes described elsewhere herein.

Performing the one or more actions may comprise providing, to a user device, a notification related to a service currently used or available for use at an address. Additionally, or alternatively, performing the one or more actions may comprise providing, to a user device associated with a service provider, a recommendation for deployment of additional infrastructure.

In some implementations, process 400 may include receiving, from a user management device, identifications of users, and determining one or more associations between at least one occupant of one or more of the occupants, for which the one or more services are available to be provided, and one or more of the users. Process 400 may further include providing to a user device, when performing the one or more actions, a notification related to a service to at least one occupant based on the one or more associations between the at least one occupant and the one or more of the users. Additionally, or alternatively, processes 400 may include providing to a user device associated with a service provider, when performing the one or more actions, a recommendation to deploy additional infrastructure to one or more physical addresses associated with at least one occupant, for which the one or more services are not available to be provided, based on the one or more associations between the at least one occupant and the one or more of the users.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a service notification platform, a first set of address-occupant pairs from a plurality of source devices,
      wherein the first set of address-occupant pairs comprises:
         identifications of physical addresses, and
         identifications of occupants;
   detecting, by the service notification platform and in the first set of address-occupant pairs, an identification of a physical address, of the physical addresses, that is associated with identifications of a plurality of the occupants,
      wherein the identifications of the plurality of the occupants include:
         an identification of a first occupant, and
         an identification of a second occupant;
   training, by the service notification platform, an occupant selection machine learning model using historical identifications of occupants associated with the plurality of source devices, the historical identifications of the occupants being associated with respective accuracies of identification of the occupants, wherein training the occupant selection machine learning model comprises:
      evaluating the occupant selection machine learning model based on determining an accuracy of output of the occupant selection machine learning model using one or more classification or network techniques; and
      finalizing the occupant selection machine learning model based on the evaluation of the occupant selection machine learning model;
   selecting, by the service notification platform and for the physical address, the identification of the first occupant to maintain association with the identification of the physical address using the finalized occupant selection machine learning model,
      wherein selecting the identification of the first occupant comprises:
         performing one or more fuzzy logic processes to determine the identifications of the plurality of the occupants are variations of a same occupant or different occupant,
         refining the first set of address-occupant pairs based on performing the one or more fuzzy logic processes to remove errors,
         determining, based on a weighted scoring technique, a weighted score associated with an accuracy of the identification of the first occupant, and
         selecting the identification of the first occupant using the finalized occupant selection machine learning model based on the refined first set of address-occupant pairs and the accuracy of the identification of the first occupant;
   discarding, by the service notification platform and from the first set of address-occupant pairs, an address-occupant pair that associates the identification of the physical address with the identification of the second occupant to create a second set of address-occupant pairs;
   generating, by the service notification platform, aggregate data by aggregating infrastructure information with the second set of address-occupant pairs,
      wherein the infrastructure information indicates one or more services available to be provided at one or more of the physical addresses;
   training, by the service notification platform, a machine learning model for determining a likelihood that a notification to a prospective user is relevant to the prospective user, the machine learning model being trained based on historical outcomes of providing notifications; and
   performing one or more actions, by the service notification platform, based on identifying the one or more services available to be provided at the one or more of the physical addresses,
      wherein the one or more actions include providing a list of one or more notifications related to a service, of the one or more services, to display, and
         wherein the list is prioritized based on a likelihood of relevance using the machine learning model.

2. The method of claim 1, wherein performing the one or more actions comprises:
   sending, to a user device, a notification, of the list of the one or more notifications, of an available service of the one or more services.

3. The method of claim 1, wherein performing the one or more actions comprises:
   providing, to a user device, a recommendation to deploy additional infrastructure.

4. The method of claim 1, wherein selecting the identification of the first occupant comprises:
   performing one or more internet searches based on at least one of:
      the physical address,
      the identification of the first occupant, or
      the identification of the second occupant; and
   selecting the second set of address-occupant pairs based on search results of the one or more internet searches.

5. The method of claim 1, wherein selecting the identification of the first occupant comprises:
   selecting the identification of the first occupant based on a quantity of the identifications of the plurality of the occupants that identify the first occupant.

6. The method of claim 5, further comprising:
   determining the quantity of the identifications of the plurality of the occupants that identify the first occupant using a fuzzy logic process of the one or more fuzzy logic processes.

7. The method of claim 1, further comprising:
   assigning values to the identifications of the plurality of the occupants based on respective source devices, of the plurality of source devices, from which the service notification platform received identifications of a plurality of occupants within the first set of address-occupant pairs,
      wherein selecting the identification of the first occupant comprises selecting the identification of the first occupant based on total values associated with the identifications of the plurality of the occupants.

8. The method of claim 7, wherein assigning the values to the identifications of the plurality of the occupants comprises determining the values using the finalized occupant selection machine learning model.

9. A service notification platform, comprising:
one or more memories; and
one or more processors communicatively coupled to the one or more memories,
configured to:
receive a first set of address-occupant pairs from a plurality of source devices,
wherein the first set of address-occupant pairs comprise identifications of physical addresses and identifications of occupants;
translate the identifications of the physical addresses into standardized identifications of the physical addresses,
wherein a standardized identification, of the standardized identifications, comprises a sub-address key that is associated with a unit within a building associated with a building address;
detect, in the first set of address-occupant pairs, an identification of a particular sub-address key that is associated with identifications of a plurality of the occupants,
wherein the identifications of the plurality of the occupants include:
an identification of a first occupant, and
an identification of a second occupant;
train an occupant selection machine learning model using historical identifications of occupants associated with the plurality of source devices, the historical identifications of the occupants being associated with respective accuracies of identification of the occupants, wherein the one or more processors, to train the occupant selection machine learning model, are configured to:
evaluate the occupant selection machine learning model based on determining an accuracy of output of the occupant selection machine learning model using one or more classification or network techniques; and
finalize the occupant selection machine learning model based on the evaluation of the occupant selection machine learning model;
select, for the particular sub-address key, the identification of the first occupant to maintain association with the particular sub-address key using the finalized occupant selection machine learning model,
wherein the one or more processors, to select the identification of the first occupant, are configured to:
perform one or more fuzzy logic processes to determine the identifications of the plurality of the occupants are variations of a same occupant or different occupant,
refine the first set of address-occupant pairs based on performing the one or more fuzzy logic processes to remove errors,
determine, based on a weighted scoring technique, a weighted score associated with an accuracy of the identification of the first occupant, and
select the identification of the first occupant using the finalized occupant selection machine learning model based on the refined first set of address-occupant pairs and the accuracy of the identification of the first occupant;
discard, from the first set of address occupant pairs, an address-occupant pair that associates the particular sub-address key with the identification of the second occupant to create a second set of address-occupant pairs;
generate aggregate data via aggregation of infrastructure information with the second set of address-occupant pairs,
wherein the infrastructure information indicates one or more services available to be provided at one or more of the physical addresses;
train a machine learning model for determining a likelihood that a notification to a prospective user is relevant to the prospective user, the machine learning model being trained based on historical outcomes of providing notifications; and
perform one or more actions based on identifying the one or more services available to be provided at the one or more of the physical addresses,
wherein the one or more processors, when performing the one or more actions, are configured to prioritize a list of one or more notifications related to a service, of the one or more services, to display, and
wherein the list is prioritized based on a likelihood of relevance using the machine learning model.

10. The service notification platform of claim 9, wherein the one or more processors are further configured to:
select the identification of the first occupant based on a quantity of the identifications of the plurality of the occupants that identify the first occupant.

11. The service notification platform of claim 9, wherein the one or more processors are further configured to:
assign values to the identifications of the plurality of the occupants based on respective source devices, of the plurality of source devices, from which the service notification platform received the first set of address-occupant pairs,
wherein the one or more processors are configured to:
select the identification of the first occupant based on total values of the identifications of the plurality of the occupants.

12. The service notification platform of claim 9, wherein the one or more processors are further configured to:
receive, from a user management device, identifications of users;
determine one or more associations between at least one occupant of one or more of the occupants, for which the one or more services are available to be provided, and one or more of the users; and
provide to a user device associated with the at least one occupant, when performing the one or more actions, a notification, of the list of the one or more notifications, of an available service of the one or more services, associated with the at least one occupant based on the one or more associations between the at least one occupant and the one or more of the users.

13. The service notification platform of claim 9, wherein the one or more processors are further configured to:
receive, from a user management device, identifications of users;
determine one or more associations between at least one occupant of the second set of address-occupant pairs, for which the one or more services are not available to be provided, and one or more of the users; and
provide to a user device associated with a service provider, when performing the one or more actions, a recommendation to deploy additional infrastructure to one or more physical addresses associated with the at least one occupant based on the one or more associations between the at least one occupant and the one or more of the users.

14. The service notification platform of claim 9, wherein the one or more processors, when selecting the identification of the first occupant to maintain association with the particular sub-address key, are further configured to:
perform one or more internet searches based on at least one of:
a physical address associated with the particular sub-address key,
the identification of the first occupant, or
the identification of the second occupant; and
select the second set of address-occupant pairs based on search results of the one or more internet searches.

15. A non-transitory computer-readable medium storing instructions, the instructions comprising:
one or more instructions that, when executed by one or more processors, cause the one or more processors to:
obtain a first set of address-occupant pairs, wherein the first set of address-occupant pairs comprise identifications of physical addresses and identifications of occupants at the physical addresses;
detect, in the first set of address-occupant pairs, an identification of a physical address, of the physical addresses, that is associated with identifications of a plurality of the occupants,
wherein the identifications of the plurality of the occupants include:
an identification of a first occupant, and
an identification of a second occupant;
train an occupant selection machine learning model using historical identifications of occupants, the historical identifications of the occupants being associated with respective accuracies of identification of the occupants, wherein the one or more instructions, to train the occupant selection machine learning model, cause the one or more processors to:
evaluate the occupant selection machine learning model based on determining an accuracy of output of the occupant selection machine learning model using one or more classification or network techniques; and
finalize the occupant selection machine learning model based on the evaluation of the occupant selection machine learning model;
select, for the physical address and based on one or more machine learning processes, the identification of the first occupant to maintain association with the identification of the physical address using the finalized occupant selection machine learning model,
wherein the one or more instructions, that cause the one or more processors to select the identification of the first occupant, cause the one or more processors to:
perform one or more fuzzy logic processes to determine the identifications of the plurality of the occupants are variations of a same occupant or different occupant,
refine the first set of address-occupant pairs based on performing the one or more fuzzy logic processes to remove errors,
determine, based on a weighted scoring technique, a weighted score associated with an accuracy of the identification of the first occupant, and
select the identification of the first occupant using the finalized occupant selection machine learning model based on the refined first set of address-occupant pairs and the accuracy of the identification of the first occupant;
discard, from the first set of address-occupant pairs, an address-occupant pair that associates the identification of the physical address with the identification of the second occupant to create a second set of address-occupant pairs;
generate aggregate data via aggregation of infrastructure information with the second set of address-occupant pairs,
wherein the infrastructure information indicates one or more services available to be provided at one or more of the physical addresses;
identify the one or more services available to be provided to one or more of the occupants based on the aggregate data;
provide an interface to provide access to the aggregate data;
train a machine learning model for determining a likelihood that a notification to a prospective user is relevant to the prospective user, the machine learning model being trained based on historical outcomes of providing notifications; and
provide, to a user device, a notification, of a list of one or more notifications, based on identification of the one or more services available to be provided to the one or more of the occupants,
wherein the list is prioritized based on a likelihood of relevance and using the machine learning model.

16. The non-transitory computer-readable medium of claim 15, wherein the one or more instructions, when executed by the one or more processors, further cause the one or more processors to:
assign, to the identifications of the physical addresses, address keys and sub-address keys,
wherein an address key is associated with a building associated with a building address and a sub-address key is associated with a unit within the building associated with the building address,
wherein selection of the identification of the first occupant is based on the sub-address keys, and
wherein generation of the aggregate data is based on the address keys.

17. The non-transitory computer-readable medium of claim 15, wherein the one or more instructions, when executed by the one or more processors, further cause the one or more processors to:
receive, from a user management device, identifications of users; and
determine one or more associations between at least one occupant of the one or more of the occupants, for which the one or more services are available to be provided, and one or more of the users,
wherein the notification comprises a notification, of the list of the one or more notifications, related to a service available of the one or more services, to the at least one occupant based on the one or more associations between the at least one occupant and the one or more of the users.

18. The non-transitory computer-readable medium of claim 15, wherein the one or more instructions, when executed by the one or more processors, further cause the one or more processors to:
- receive, from a user management device, identifications of users; and
- determine one or more associations between at least one occupant of the second set of address-occupant pairs, for which the one or more services are not available to be provided, and one or more of the users,
  - wherein the notification comprises a recommendation to deploy additional infrastructure to one or more physical addresses associated with the at least one occupant based on the one or more associations between the at least one occupant and the one or more of the users.

19. The non-transitory computer-readable medium of claim 15, wherein the one or more instructions, when executed by the one or more processors, further cause the one or more processors to:
- perform one or more internet searches based on at least one of:
  - the physical address,
  - the identification of the first occupant, or
  - the identification of the second occupant, and
- wherein the one or more instructions that cause the one or more processors to generate the second set of address-occupant pairs, cause the one or more processors to:
  - generate the second set of address-occupant pairs based on search results of the one or more internet searches.

20. The non-transitory computer-readable medium of claim 15, wherein the one or more instructions, when executed by the one or more processors, further cause the one or more processors to:
- translate, before detecting the identification of the physical address that is associated with identifications of the plurality of the occupants, the identifications of the physical addresses into standardized identifications of the physical addresses.

* * * * *